United States Patent
Izawa et al.

(10) Patent No.: US 8,137,862 B2
(45) Date of Patent: Mar. 20, 2012

(54) FUEL CELL

(75) Inventors: Yasuhiro Izawa, Mishima (JP); Satoshi Aoyama, Susono (JP); Maiko Ikuno, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1134 days.

(21) Appl. No.: 11/921,556

(22) PCT Filed: Jun. 6, 2006

(86) PCT No.: PCT/JP2006/311699
§ 371 (c)(1),
(2), (4) Date: Dec. 5, 2007

(87) PCT Pub. No.: WO2006/134849
PCT Pub. Date: Dec. 21, 2006

(65) Prior Publication Data
US 2008/0226951 A1   Sep. 18, 2008

(30) Foreign Application Priority Data
Jun. 17, 2005 (JP) .................. 2005-177432

(51) Int. Cl.
*H01M 2/08* (2006.01)
*H01M 2/14* (2006.01)
*H01M 2/16* (2006.01)
*H01M 2/18* (2006.01)
*H01M 4/64* (2006.01)
*H01M 8/24* (2006.01)

(52) U.S. Cl. ........ 429/508; 429/457; 429/463; 429/507; 429/518

(58) Field of Classification Search .......... 429/457, 429/463, 507–510, 514, 518, 535
See application file for complete search history.

(56) References Cited

U.S. PATENT DOCUMENTS

| 4,942,099 A | * | 7/1990 | Isobe et al. ............ 429/460 |
| 6,677,069 B1 | * | 1/2004 | Piascik et al. ............ 429/459 |

FOREIGN PATENT DOCUMENTS

| DE | 198 05 142 A1 | 8/1999 |
| EP | 1 359 635 A1 | 11/2003 |
| EP | 1 492 190 A2 | 12/2004 |
| JP | A 2002-358975 | 12/2002 |
| JP | A 2003-317743 | 11/2003 |
| JP | A 2004-146129 | 5/2004 |
| JP | A 2004-146130 | 5/2004 |
| JP | A 2004-207170 | 7/2004 |
| JP | A 2004-227848 | 8/2004 |
| JP | A 2004-319290 | 11/2004 |
| JP | A 2004-319291 | 11/2004 |
| JP | 2006073393 A | * 3/2006 |

OTHER PUBLICATIONS

Machine Translation and Abstract in English of JP 2006-073393.*

* cited by examiner

*Primary Examiner* — Barbara Gilliam
*Assistant Examiner* — Claire L Roe
(74) *Attorney, Agent, or Firm* — Oliff & Berridge, PLC

(57) ABSTRACT

A fuel cell includes a joint portion A in which a first conductive separator, an electrolyte-strengthening substrate and a second conductive separator are jointed in order with a brazing material. The electrolyte-strengthening substrate is formed so as to be larger than a joint area of the first conductive separator and a joint area of the second conductive separator in the joint portion. The electrolyte-strengthening substrate has an insulating property at least at an area where the electrolyte-strengthening substrate contacts with the brazing material.

6 Claims, 7 Drawing Sheets

FUEL CELL

TECHNICAL FIELD

This invention generally relates to a fuel cell that has a separator.

BACKGROUND ART

In general, a fuel cell is a device that obtains electrical power from fuel, hydrogen and oxygen. Fuel cells are being widely developed as an energy supply device because fuel cells are environmentally superior and can achieve high energy efficiency.

The fuel cell has a structure in which a plurality of electrical power generators is stacked with a separator being interposed therebetween, the electrical power generator having a structure in which an anode and a cathode hold an electrolyte therebetween. In this structure, a power generating efficiency is degraded when the separators are mechanically in touch with each other and are electrically conducted to each other. It is therefore necessary to insulate the separators from each other. And so, Patent Document 1 discloses an art where a ceramics layer is provided between the separators with a brazing material. With the art, it is possible to insulate the separators from each other.

Patent Document 1: Japanese Patent Application Publication No. 2004-227848

DISCLOSURE OF THE INVENTION

Problems to be Solved by The Invention

However, the separators may be electrically conducted to each other when the brazing material is out of the layers, because a shape of an outer circumference of the separator is the same as that of the ceramics layer in the art disclosed in Patent Document 1.

An object of the present invention is to provide a fuel cell that prevents an electrical short caused by a brazing material.

Means for Solving The Problems

A fuel cell in accordance with the present invention is characterized by comprising a joint portion in which a first conductive separator, an electrolyte-strengthening substrate and a second conductive separator are jointed in order with a brazing material. The electrolyte-strengthening substrate is formed so as to be larger than a joint area of the first conductive separator and a joint area of the second conductive separator in the joint portion. And the electrolyte-strengthening substrate has an insulating property at least at an area where the electrolyte-strengthening substrate contacts with the brazing material. The electrolyte-strengthening substrate has an end portion projecting toward outside by a given distance from an end of the first conductive separator and the second conductive separator.

With the fuel cell in accordance with the present invention, a contact is restrained between the brazing material between the electrolyte-strengthening substrate and the first conductive separator and the brazing material between the electrolyte-strengthening substrate and the second conductive separator, because the electrolyte-strengthening substrate is formed so as to be larger than the joint area of the first conductive separator and the joint area of the second conductive separator in the joint portion. It is therefore possible to restrain an electrical short between the first conductive separator and the second conductive separator. Accordingly, in the fuel cell in accordance with the present invention, it is possible to restrain an electrical short caused by the brazing material.

The electrolyte-strengthening substrate may have an insulating layer at one of the joint areas. The insulating layer may extend by a given distance from an outside end face and from an inner side end face of the insulating layer side one of the first conductive separator and the second conductive separator. In this case, it is possible to restrain an electrical short between the first conductive separator and the second conductive separator.

The electrolyte-strengthening substrate may have an insulating layer formed on both faces thereof at the joint portion. In this case, the first separator is insulated from the second separator with the insulating layers on the both faces of the electrolyte-strengthening substrate. At least one of the insulating layers may be composed of electrolyte. In this case, the first separator is insulated from the second separator with the electrolyte. And it is not necessary to provided an insulating layer if an electrolyte in a power-generating portion of a fuel cell is used. A manufacturing process of the fuel cell in accordance with the present invention is shortened, and a manufacturing cost is reduced.

The insulating layer may be composed of ceramics. And the fuel cell may have a primer layer between the insulating layer and the electrolyte-strengthening substrate. In this case, adhesiveness between the primer layer and the electrolyte-strengthening substrate and adhesiveness between the primer layer and the insulating layer are higher than adhesiveness between the insulating layer and the electrolyte-strengthening substrate. The adhesiveness between the electrolyte-strengthening substrate and the insulating layer is increased. It is therefore possible to restrain a separation between each of the layers. Accordingly, the fuel cell in accordance with the present invention can generate electrical power stably.

A fuel cell is characterized by comprising a joint portion in which a first conductive separator, an electrolyte-strengthening substrate and a second conductive separator are jointed in order with a conductive adhesive agent. The electrolyte-strengthening substrate is formed so as to be larger than a joint area of the first conductive separator and a joint area of the second conductive separator in the joint portion. And the electrolyte-strengthening substrate has an insulating property at least at an area where the electrolyte-strengthening substrate contacts with the conductive adhesive agent. The electrolyte-strengthening substrate has an end portion projecting toward outside by a given distance from an end of the first conductive separator and the second conductive separator.

With the fuel cell in accordance with the present invention, a contact is restrained between the conductive adhesive agent between the electrolyte-strengthening substrate and the first conductive separator and the conductive adhesiveness agent between the electrolyte-strengthening substrate and the second conductive separator, because the electrolyte-strengthening substrate is formed so as to be larger than the joint area of the first conductive separator and the joint area of the second conductive separator in the joint portion. It is therefore possible to restrain an electrical short between the first conductive separator and the second conductive separator. Accordingly, in the fuel cell in accordance with the present invention, it is possible to restrain an electrical short caused by the conductive adhesive agent.

EFFECTS OF THE INVENTION

According to the present invention, it is possible to restrain an electrical short caused by a brazing material.

BEST MODES FOR CARRYING OUT THE INVENTION

A description will be given of best modes for carrying out the present invention.
(First Embodiment)

Figure 1:
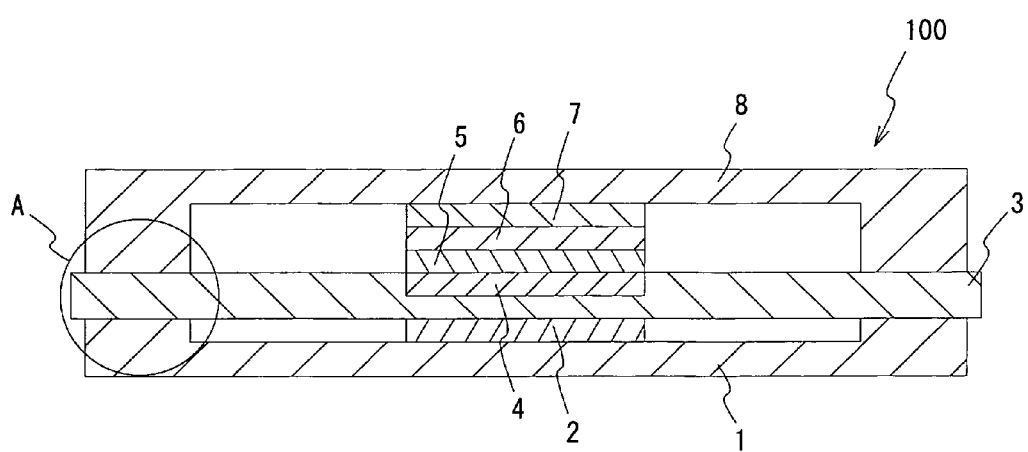
FIG. 1 illustrates a schematic cross sectional view of a fuel cell in accordance with a first embodiment of the present invention.

FIG. 1 illustrates a schematic cross sectional view of a fuel cell 100 in accordance with a first embodiment of the present invention. In this embodiment, a hydrogen permeable membrane fuel cell is used as a fuel cell. Here, the hydrogen permeable membrane fuel cell has a hydrogen permeable membrane. The hydrogen permeable membrane is composed of a metal having hydrogen permeability. The hydrogen permeable membrane fuel cell has a structure in which an electrolyte having proton conductivity is deposited on the hydrogen permeable membrane. Some hydrogen provided to an anode is converted into protons with catalyst reaction. The protons are conducted in the electrolyte having proton conductivity, react with oxygen provided to a cathode, and converted into water. Electrical power is thus generated. A description will be given of a structure of the fuel cell 100.

As shown in FIG. 1, the fuel cell 100 has separators 1 and 8, power collectors 2 and 7, an electrolyte-strengthening substrate 3, a hydrogen permeable membrane 4, an electrolyte 5 and a cathode 6. The separator 1 is composed of a conductive material such as stainless steal. And a convex portion is formed at a peripheral area on an upper face of the separator 1. The power collector 2 is, for example, composed of a conductive material such as a SUS430 porous material, a Ni porous material, a Pt-coated $Al_2O_3$ porous material, or a Pt mesh. The power collector 2 is laminated on a center area of the separator 1.

The electrolyte-strengthening substrate 3 is composed of a conductive material such as stainless steel and strengthens the hydrogen permeable membrane 4. The electrolyte-strengthening substrate 3 is formed on the separator 1 through the convex portion of the separator 1 and the power collector 2. The electrolyte-strengthening substrate 3 is jointed to the separator 1. A recess is formed at a center area of an upper face of the electrolyte-strengthening substrate 3. The hydrogen permeable membrane 4 is implanted in the recess. The hydrogen permeable membrane 4 acts as an anode to which fuel gas is provided, and is composed of a hydrogen permeable metal. A metal composing the hydrogen permeable membrane 4 is such as palladium, vanadium, titanium, tantalum or the like.

The electrolyte 5 is laminated on the hydrogen permeable membrane 4. The electrolyte 5 is, for example, composed of a proton conductor such as a perovskite-type proton conductor ($BaCeO_3$ or the like), a solid acid proton conductor ($CsHSO_4$ or the like). The cathode 6 is, for example, composed of a conductive material such as lanthanum cobaltite, lanthanum manganate, silver, platinum, or platinum-supported carbon, and is laminated on the electrolyte 5.

The power collector 7 is, for example, composed of a conductive material such as a SUS430 porous material, a Ni porous material, a Pt-coated $Al_2O_3$ porous material, or a Pt mesh. The power collector 7 is laminated on the cathode 6. The separator 8 is composed of a conductive material such as stainless steel, and is laminated on the power collector 7. And a convex portion is formed at a peripheral area of a lower face of the separator 8. The separator 8 is jointed to the electrolyte-strengthening substrate 3 through the convex portion of the separator 8. Hereinafter, a joint portion between the separators 1 and 8 and the electrolyte-strengthening substrate 3 is referred to as a sealing portion A. The electrolyte-strengthening substrate 3 has insulating property at the sealing portion A. Details are described later.

Next, a description will be given of an operation of the fuel cell 100. A fuel gas including hydrogen is provided to a gas passageway of the separator 1. This fuel gas is provided to the hydrogen permeable membrane 4 via the power collector 2 and the electrolyte-strengthening substrate 3. Some hydrogen in the fuel gas is converted into protons at the hydrogen permeable membrane 4. The protons are conducted in the hydrogen permeable membrane 4 and the electrolyte 5, and get to the cathode 6.

On the other hand, an oxidant gas including oxygen is provided to a gas passageway of the separator 8. This oxidant gas is provided to the cathode 6 via the power collector 7. The protons react with oxygen in the oxidant gas provided to the cathode 6. Water and electrical power are thus generated. The generated electrical power is collected via the power collectors 2 and 7 and the separators 1 and 8.

In the embodiment, it is restrained that a power generating efficiency of the fuel cell 100 is degraded, because the electrolyte-strengthening substrate 3 has an insulating property at the sealing portion A. A description will be given of details.

Figure 2:
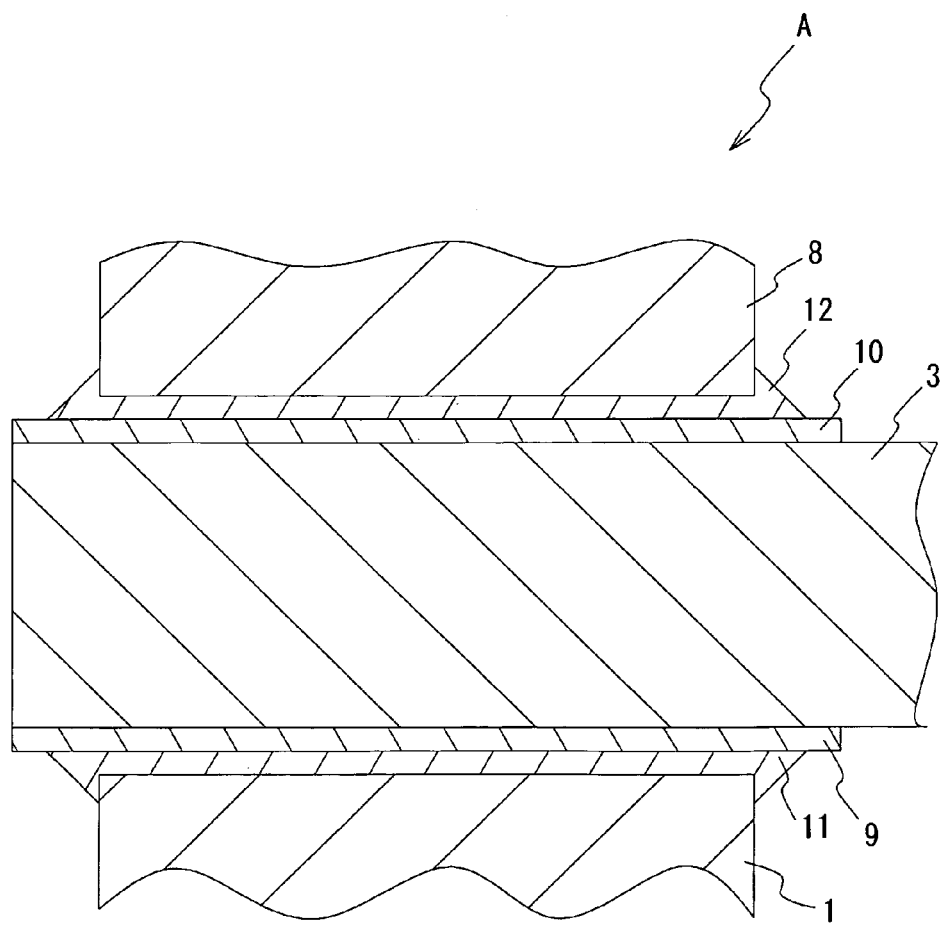
FIG. 2 illustrates an enlarged cross sectional view of a sealing portion of a fuel cell shown in FIG. 1.

FIG. 2 illustrates an enlarged cross sectional view of the sealing portion A of the fuel cell 100 shown in FIG. 1. As shown in FIG. 2, the electrolyte-strengthening substrate 3 is fixed to the separator 1 through an insulating layer 9 and a brazing material 11, and is fixed to the separator 8 through an insulating layer 10 and a brazing material 12. An end portion of the electrolyte-strengthening substrate 3 is projecting toward outside of the fuel cell 100, compared to the end of the separators 1 and 8.

The insulating layers 9 and 10 are composed of an insulating material such as $Al_2O_3$. And an outer end of the insulating layers 9 and 10 extends from an outer end face of the separators 1 and 8 by a few mm. An inner end of the insulating layers 9 and 10 extends from an inner end face of the separators 1 and 8 by a few mm. The insulating layers 9 and 10 are therefore formed so as to be larger than the joint area between the separators 1 and 8 and the electrolyte-strengthening substrate 3. Thickness of the insulating layers 9 and 10 is approximately a few tens μm. In the embodiment, an electrical short is restrained between the separators 1 and 8 and the electrolyte-strengthening substrate 3, because the insulating layers 9 and 10 are provided between the separators 1 and 8 and the electrolyte-strengthening substrate 3.

The brazing materials 11 and 12 are, for example, made of an Ag—Cu—Ti-based brazing material. The brazing materials 11 and 12 act as an adhesive agent fixing the separators 1 and 8 to the electrolyte-strengthening substrate 3. Thickness of the brazing materials 11 and 12 is, for example, a few μm.

A contact between the brazing material 11 and the brazing material 12 is restrained even if the brazing materials 11 and 12 overflow from between the separators 1 and 8 and the electrolyte-strengthening substrate 3 because of a pressure from the separators 1 and 8 to the electrolyte-strengthening substrate 3, because the insulating layer 9 is formed so as to be larger than a joint area between the separator 1 and the electrolyte-strengthening substrate 3 and the insulating layer 10 is formed so as to be larger than a joint area between the separator 8 and the electrolyte-strengthening substrate 3 in the sealing portion A. And even if the brazing materials 11 and 12 are melted when the temperature of the fuel cell 100 is increased, a contact between the melted brazing material 11 and the melted brazing material 12 is restrained. It is therefore possible to restrain an electrical short caused by the brazing material in the fuel cell 100 in accordance with the embodiment.

Figure 3A:
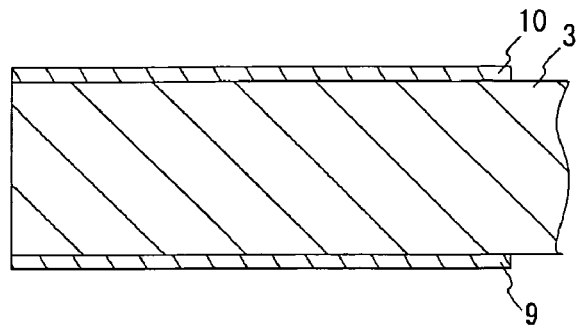
FIG. 3A through FIG. 3D illustrate a manufacturing method of a sealing portion of a fuel cell.

Next, a description will be given of a manufacturing method of the sealing portion A of the fuel cell 100. FIG. 3A through FIG. 3D illustrate a manufacturing flow diagram accounting for the manufacturing method of the sealing portion A of the fuel cell 100. As shown in FIG. 3A, the insulating layer 9 is formed at the peripheral area on the lower face of the electrolyte-strengthening substrate 3, and the insulating layer 10 is formed at the peripheral area on the upper face of the electrolyte-strengthening substrate 3. The insulating layers 9 and 10 may be formed with a spraying method, an ion plating method or the like.

Figure 3B:
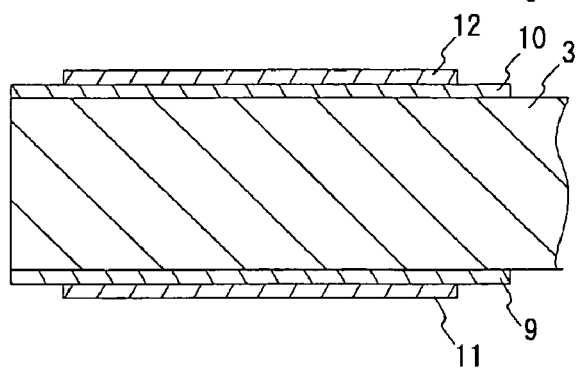
Figure 3C:
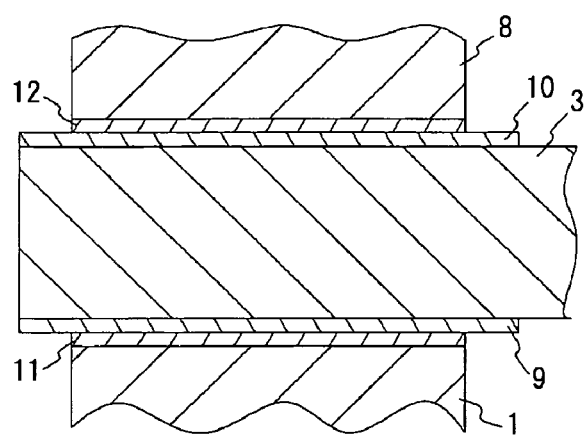
Figure 3D:
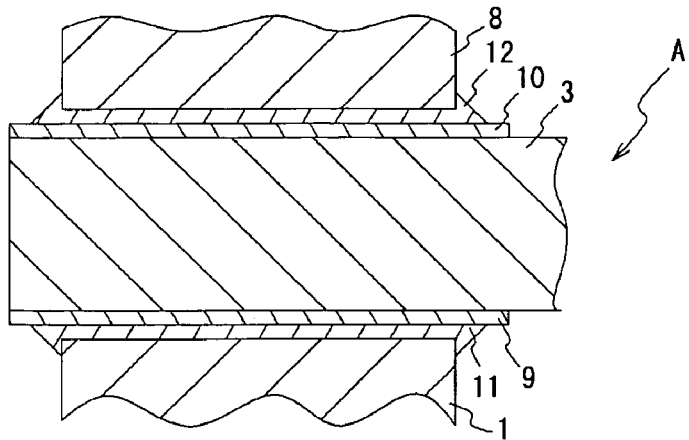

Next, as shown in FIG. 3B, the brazing material 11 is formed under the insulating layer 9, and the brazing material 12 is formed on the insulating layer 10. Then, as shown in FIG. 3C, the insulating layer 9 contacts with the separator 1 through the brazing material 11, and the insulating layer 10 contacts with the separator 8 through the brazing material 12. Next, the insulating layer 9 is jointed to the separator 1 and the insulating layer 10 is jointed to the separator 8 when the brazing materials 11 and 12 are subjected to a thermal treatment. With the process, the sealing portion A is manufactured as shown in FIG. 3D.

There is a case where the brazing materials 11 and 12 overflow from between the separators 1 and 8 and the insulating layers 9 and 10 when the separators 1 and 8 contact with the insulating layers 9 and 10. However, a contact between the overflowing brazing material 11 and the overflowing brazing material 12 is restrained, because the insulating layer 9 is formed so as to be larger than the joint area between the separator 1 and the electrolyte-strengthening substrate 3 and the insulating layer 10 is formed so as to be larger than the joint area between the separator 8 and the electrolyte-strengthening substrate 3 in the sealing portion A.

Figure 4:
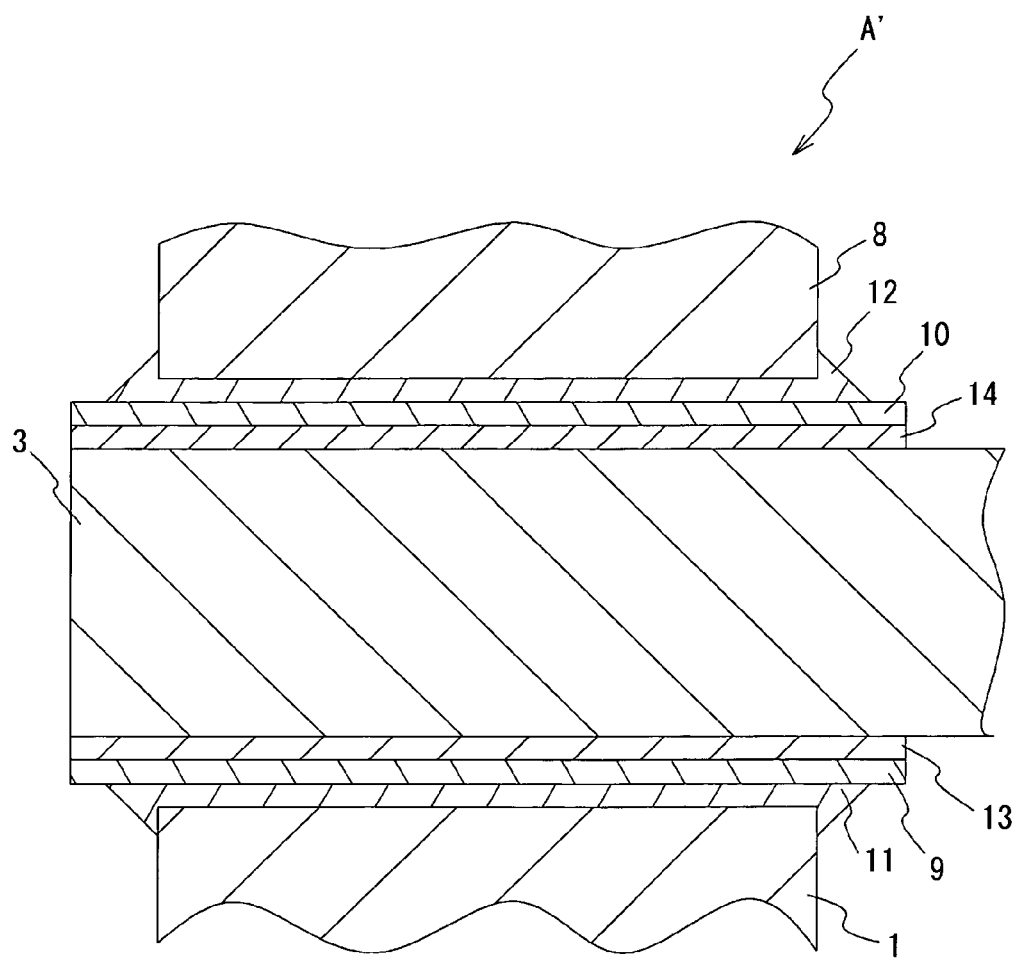
FIG. 4 illustrates a schematic cross sectional view of another example of a sealing portion.

FIG. 4 illustrates a schematic cross sectional view of a sealing portion A' being another example of the sealing portion A. In the sealing portion A', a primer layer 13 is formed between the electrolyte-strengthening substrate 3 and the insulating layer 9 and a primer layer 14 is formed between the electrolyte-strengthening substrate 3 and the insulating layer 10, being different from the sealing portion A. The primer layers 13 and 14 are composed of an active metal such as Ag—Cu—Ti alloy or Ag—Ti alloy.

Here, adhesiveness between an active metal and a metal and adhesiveness between an active metal and a ceramics are generally higher than that between a ceramics and a metal. Adhesiveness is therefore increased between the electrolyte-strengthening substrate 3 and the insulating layers 9 and 10, because the primer layers 13 and 14 are formed between the electrolyte-strengthening substrate 3 and the insulating layers 9 and 10 in the embodiment. It is therefore possible to restrain a separation between each of the layers in the fuel cell 100. Accordingly, the fuel cell 100 in accordance with the embodiment can generate electrical power stably.

Figure 5A:
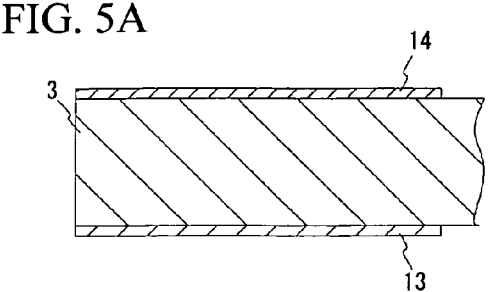
FIG. 5A through FIG. 5E illustrate a manufacturing flow diagram accounting for a method of a sealing portion.

Next, a description will be given of a manufacturing method of the sealing portion A'. FIG. 5A through FIG. 5E illustrate a manufacturing flow diagram accounting for the manufacturing method of the sealing portion A'. As shown in FIG. 5A, the primer layer 13 is formed at the peripheral area on the lower face of the electrolyte-strengthening substrate 3, and the primer layer 13 is formed at the peripheral area on the upper face of the electrolyte-strengthening substrate 3. The primer layers 13 and 14 may be formed with a physical vapor deposition method or the like.

Figure 5B:
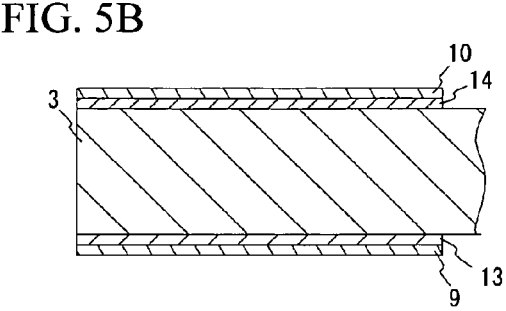
Figure 5C:
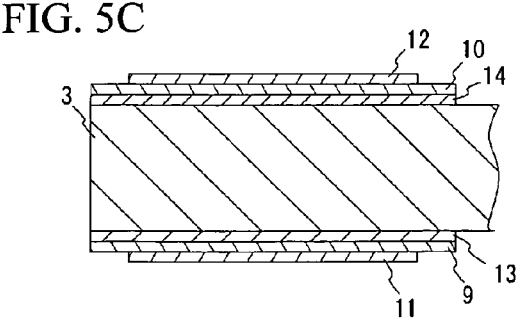
Figure 5D:
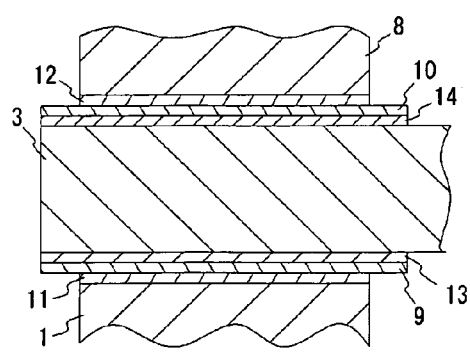
Figure 5E:
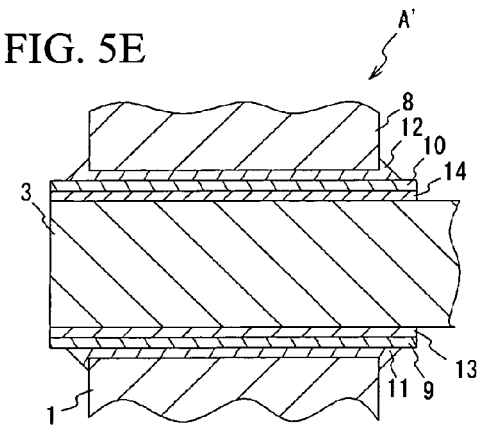

Next, as shown in FIG. 5B, the insulating layer 9 is formed under the primer layer 13, and the insulating layer 10 is formed on the primer layer 14. Then, as shown in FIG. 5C, the brazing material 11 is formed under the insulating layer 9, and the brazing material 12 is formed on the insulating layer 10. Next, as shown in FIG. 5D, the insulating layer 9 contacts with the separator 1 through the brazing material 11, and the insulating layer 10 contacts with the separator 8 through the brazing material 12. Then, the insulating layer 9 is jointed to the separator 1 and the insulating layer 10 is jointed to the separator 8 when the brazing materials 11 and 12 are subjected to a thermal treatment. With the process, the sealing portion A' is manufactured as shown in FIG. 5E.

(Second Embodiment)

Figure 6:
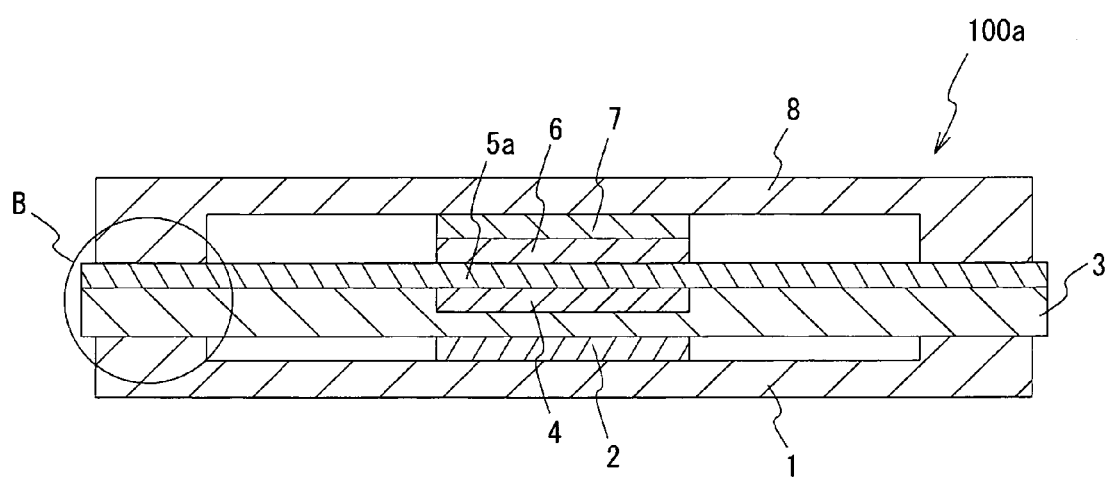
FIG. 6 illustrates a schematic cross sectional view of a fuel cell in accordance with a second embodiment of the present invention.

FIG. 6 illustrates a schematic cross sectional view of a fuel cell 100a in accordance with a second embodiment of the present invention. The fuel cell 100a has an electrolyte 5a instead of the electrolyte 5, being different from the fuel cell 100 in FIG. 1. The electrolyte 5a is formed so as to cover the upper face of the electrolyte-strengthening substrate 3. The electrolyte 5a is composed of a material as same as that of the electrolyte 5. In the embodiment, the electrolyte-strengthening substrate 3 is insulated from the separator 8 with the electrolyte 5a.

Figure 7:
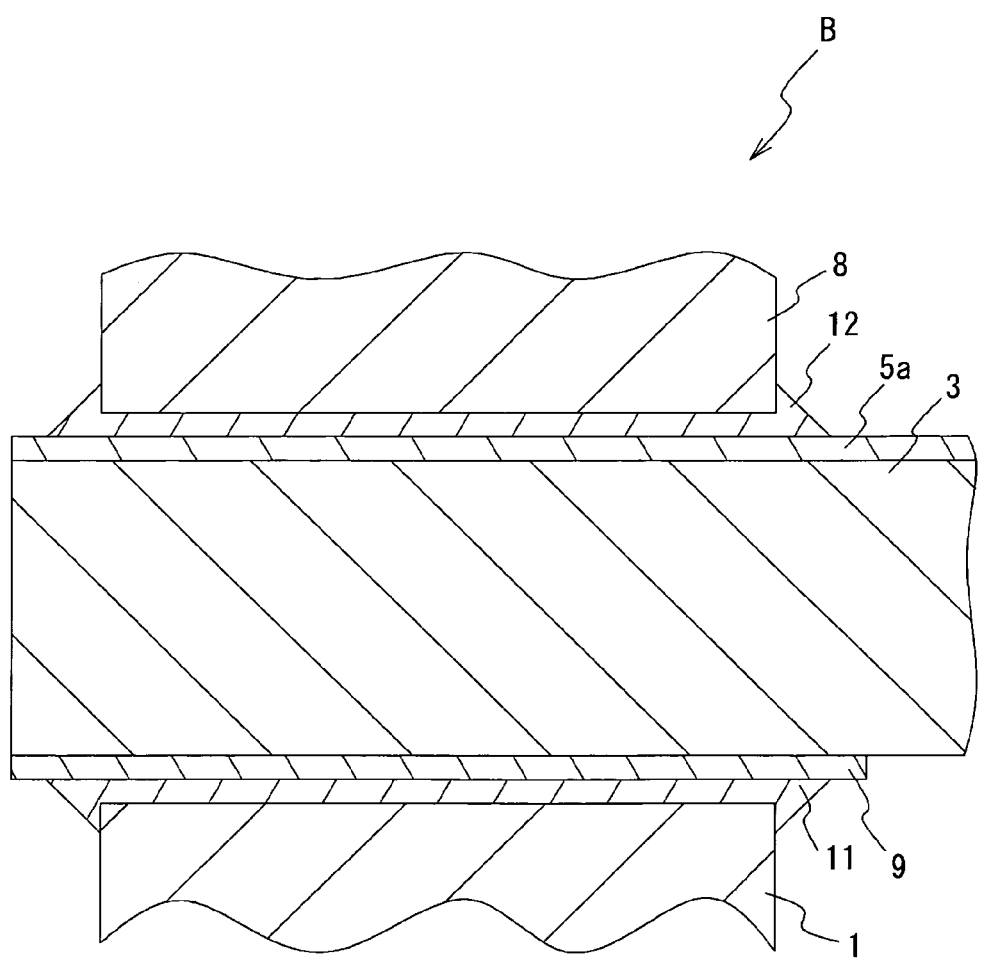
FIG. 7 illustrates an enlarged cross sectional view of a sealing portion of a fuel cell shown in FIG. 6.

FIG. 7 illustrates an enlarged cross sectional view of the sealing portion B of the fuel cell 100a shown in FIG. 6. The sealing portion B is different from the sealing portion A in a point that the electrolyte 5a is provided instead of the insulating layer 10. As shown in FIG. 7, the electrolyte 5a is formed to an end of the electrolyte-strengthening substrate 3. The electrolyte 5a insulates the electrolyte-strengthening substrate 3 from the separator 8, because the electrolyte 5a is composed of an insulating material.

The electrolyte 5a may be coated on the electrolyte-strengthening substrate 3 and on the hydrogen permeable membrane 4 with a sputtering method or with a laser. In the embodiment, the manufacturing process is shorter than a case where the electrolyte 5 and the insulating layer 10 are formed separately, because the electrolyte 5a is used as the insulating layer. A manufacturing cost of the fuel cell 100a is therefore reduced.

In the first embodiment and the second embodiment, the separator 1 corresponds to the first conductive separator; the separator 8 corresponds to the second conductive separator;

the sealing portions A and B correspond to the joint portion; and the brazing materials 11 and 12 correspond to the conductive adhesive agent.

The first embodiment and the second embodiment may be combined. For example, a primer layer may be formed between the electrolyte 5a and the electrolyte-strengthening substrate 3 in the second embodiment. The present invention may be applied to another type of a fuel cell having an electrolyte-strengthening substrate, although the present invention is applied to a hydrogen permeable membrane fuel cell in the first embodiment and the second embodiment. A description is given of a joint at the peripheral portion of the electrolyte-strengthening substrate in the first embodiment and the second embodiment. However, it is not limited to the joint position. For example, the present invention may be applied to a position where a separator at a manifold portion is jointed to an electrolyte-strengthening substrate.

The invention claimed is:

1. A fuel cell comprising
a joint portion in which a first conductive separator, an electrolyte-strengthening substrate and a second conductive separator are jointed in order with a brazing material,
wherein:
the electrolyte-strengthening substrate is formed so as to be larger than a joint area of the first conductive separator and a joint area of the second conductive separator in the joint portion; and
the electrolyte-strengthening substrate has an insulating property at least at an area where the electrolyte-strengthening substrate contacts with the brazing material; and
the electrolyte-strengthening substrate has an end portion projecting toward outside by a given distance from an end of the first conductive separator and the second conductive separator.

2. The fuel cell as claimed in claim 1, wherein:
the electrolyte-strengthening substrate has an insulating layer at one of the joint areas; and
the insulating layer extends by a given distance from an outside end face and from an inner side end face of the insulating layer side one of the first conductive separator and the second conductive separator.

3. The fuel cell as claimed in claim 1, wherein the electrolyte-strengthening substrate has an insulating layer formed on both faces thereof at the joint portion.

4. The fuel cell as claimed in claim 2, wherein at least one of the insulating layers is composed of electrolyte.

5. The fuel cell as claimed in claim 2, wherein:
the insulating layer is composed of ceramics; and
the fuel cell has a primer layer between the insulating layer and the electrolyte-strengthening substrate.

6. A fuel cell comprising
a joint portion in which a first conductive separator, an electrolyte-strengthening substrate and a second conductive separator are jointed in order with a conductive adhesive agent,
wherein:
the electrolyte-strengthening substrate is formed so as to be larger than a joint area of the first conductive separator and a joint area of the second conductive separator in the joint portion; and
the electrolyte-strengthening substrate has an insulating property at least at an area where the electrolyte-strengthening substrate contacts with the conductive adhesive agent; and
the electrolyte-strengthening substrate has an end portion projecting toward outside by a given distance from an end of the first conductive separator and the second conductive separator.

* * * * *